(12) United States Patent
Kaneko et al.

(10) Patent No.: US 11,011,998 B2
(45) Date of Patent: May 18, 2021

(54) INVERTER POWER GENERATOR AND METHOD FOR CONTROLLING SAME

(71) Applicant: YAMAHA MOTOR POWER PRODUCTS KABUSHIKI KAISHA, Kakegawa (JP)

(72) Inventors: Masataka Kaneko, Shizuoka (JP); Keisuke Sugiura, Shizuoka (JP)

(73) Assignee: YAMAHA MOTOR POWER PRODUCTS KABUSHIKI KAISHA, Shizuoka (JP)

( * ) Notice: Subject to any disclaimer, the term of this patent is extended or adjusted under 35 U.S.C. 154(b) by 76 days.

(21) Appl. No.: 16/483,067

(22) PCT Filed: Oct. 12, 2017

(86) PCT No.: PCT/JP2017/036983
§ 371 (c)(1),
(2) Date: Aug. 2, 2019

(87) PCT Pub. No.: WO2018/142676
PCT Pub. Date: Aug. 9, 2018

(65) Prior Publication Data
US 2020/0014311 A1    Jan. 9, 2020

(30) Foreign Application Priority Data

Feb. 6, 2017    (JP) .............................. JP2017-019304

(51) Int. Cl.
*H02M 7/537* (2006.01)
*H02P 9/10* (2006.01)
*H02P 25/22* (2006.01)

(52) U.S. Cl.
CPC .............. *H02M 7/537* (2013.01); *H02P 9/10* (2013.01); *H02P 25/22* (2013.01)

(58) Field of Classification Search
CPC .. H02P 9/00; H02P 25/22; B60L 50/00; B60L 3/00; B60L 15/00; F02D 29/06; F02D 45/00; B60W 10/08; B60K 6/46
See application file for complete search history.

(56) References Cited

U.S. PATENT DOCUMENTS

| | | | | |
|---|---|---|---|---|
| 5,422,518 A | * | 6/1995 | Sashida | .................... H02J 3/38 307/75 |
| 2005/0029992 A1 | * | 2/2005 | Endou | ...................... H02P 9/04 322/29 |

(Continued)

FOREIGN PATENT DOCUMENTS

| | | |
|---|---|---|
| JP | 05-18285 A | 1/1993 |
| JP | 2004-040876 A | 2/2004 |

(Continued)

OTHER PUBLICATIONS

Official Communication issued in International Patent Application No. PCT/JP2017/036983, dated Jan. 9, 2018.

(Continued)

*Primary Examiner* — Eduardo Colon Santana
*Assistant Examiner* — Said Bouziane
(74) *Attorney, Agent, or Firm* — Keating and Bennett, LLP

(57) ABSTRACT

An inverter power generator includes an engine, an actuator that adjusts the position of a throttle valve of the engine, a power generator that generates AC power from a driving force of the engine, a converter that converts the AC power outputted from the power generator into DC power, an inverter that converts the DC power outputted from the converter into AC power, a current detector that detects the current of the AC power outputted from the inverter, a voltage detector that detects the voltage of the AC power outputted from the inverter, a target rotation speed determiner that determines a target rotation speed of the engine (Continued)

based on a detected current value and a correction value based on the difference between a target voltage value and the detected voltage value, and an actuator controller that controls the actuator based on the determined target rotation speed.

9 Claims, 7 Drawing Sheets

(56) References Cited

U.S. PATENT DOCUMENTS

2012/0293140 A1* 11/2012 Hashimoto ............... H02P 9/02
                                                                 322/94
2014/0232112 A1    8/2014 Wada et al.

FOREIGN PATENT DOCUMENTS

| JP | 2010-011687 A | 1/2010 |
| JP | 2010-035262 A | 2/2010 |
| JP | 2012-244699 A | 12/2012 |
| WO | 2013/088523 A1 | 6/2013 |

OTHER PUBLICATIONS

Official Communication issued in corresponding European Patent Application No. 17895011.9, dated Oct. 7, 2020.

* cited by examiner

INVERTER POWER GENERATOR AND METHOD FOR CONTROLLING SAME

BACKGROUND OF THE INVENTION

1. Field of the Invention

The present invention relates to an inverter power generator and a method of controlling the inverter power generator.

2. Description of the Related Art

Conventionally, inverter power generators that convert alternating current (AC) power from a power generating unit driven by an engine into direct current (DC) power via a converter and convert the DC power from the converter into AC power via an inverter to output to a load have been known. In such an inverter power generator, in general, the target rotation speed of the engine is determined in accordance with the output power from the inverter. In the case that the output voltage of the inverter is substantially constant, the target rotation speed of the engine may be determined in accordance with the output current of the inverter in some cases.

Japanese Patent Laid-open Publication No. 2012-244699 describes that the target rotation speed of the engine is determined in accordance with the effective power consumed by a load.

The above-described conventional inverter power generator may suffer from a drop in the output voltage of the inverter when a load varies (mainly, in applying a load). In this case, as the drop in the output voltage of the inverter leads to a drop in the target rotation speed of the engine, the engine cannot be sufficiently accelerated, and the responsiveness in controlling the engine rotation speed may not be sufficient.

SUMMARY OF THE INVENTION

Preferred embodiments of the present invention provide inverter power generators that improve the responsiveness in controlling the rotation speed of an engine when a load varies, and also provide methods of controlling the inverter power generators.

An inverter power generator according to a preferred embodiment of the present invention includes an engine, an actuator that adjusts the position of a throttle valve of the engine, a power generator that generates AC power from a driving force of the engine, a converter that converts the AC power outputted from the power generator into DC power, an inverter that converts the DC power outputted from the converter into AC power, a current detector that detects the current of the AC power outputted from the inverter, a voltage detector that detects the voltage of the AC power outputted from the inverter, a target rotation speed determiner that determines a target rotation speed of the engine based on the detected current value detected by the current detector and a correction value based on the difference between a target voltage value of the AC power outputted from the inverter and the detected voltage value detected by the voltage detector, and an actuator controller that controls the actuator based on the determined target rotation speed.

A method of controlling an inverter power generator according to a preferred embodiment of the present invention includes an inverter power generator including an engine, an actuator that adjusts the position of a throttle valve of the engine, a power generator that generates AC power from a driving force of the engine, a converter that converts the AC power outputted from the power generator into DC power, an inverter that converts the DC power outputted from the converter into AC power, a current detector that detects the current of the AC power outputted from the inverter, and a voltage detector that detects the voltage of the AC power outputted from the inverter, the method including determining a target rotation speed of the engine based on the detected current value detected by the current detector and a correction value based on the difference between a target voltage value of the AC power outputted from the inverter and the detected voltage value detected by the voltage detector; and controlling the actuator based on the determined target rotation speed.

According to a preferred embodiment of the present invention, the target rotation speed of an engine is determined using a correction value based on the difference between a target voltage value and a detected voltage value. This makes it possible to improve responsiveness in controlling the engine rotation speed even when the output voltage of an inverter drops due to variations in the load.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings.

Figure 1:
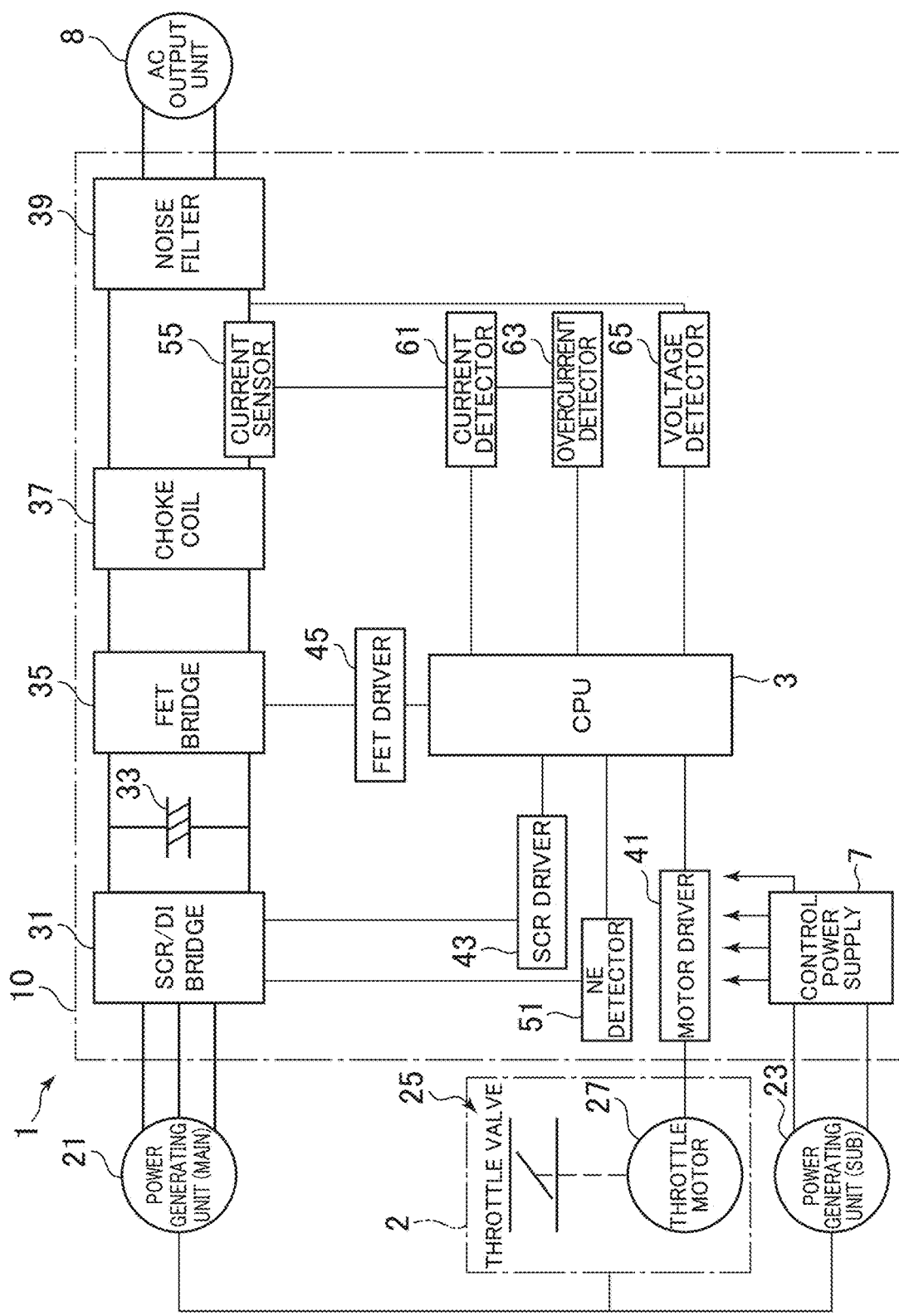
FIG. 1 is a block diagram illustrating an example of an inverter power generator according to a preferred embodiment of the present invention.

FIG. 1 is a block diagram illustrating an example of an inverter power generator according to a preferred embodiment of the present invention. The inverter power generator 1 includes an engine 2. The engine 2 is, for example, an internal combustion engine that ignites fuel, such as gasoline, with sparks. The engine 2 includes a throttle motor 27 that adjusts the position of a throttle valve 25 provided to an inlet pipe. The throttle motor 27 is one example of an actuator and includes, for example, a stepping motor.

The engine 2 is connected to power generators 21, 23. Each of the power generators 21, 23 includes a rotor including permanent magnets that rotates together with the output shaft of the engine 2, and a stator including a coil disposed so as to intersect with the magnetic flux from the permanent magnet. Of these generators, the main power generator 21 includes coils having three phases (U, V, and W-phases). The main power generator 21 generates three-phase AC power from a driving force of the engine 2 and outputs to a control device 10.

Meanwhile, the sub-power generator 23 includes single-phase coils. The sub-power generator 23 generates single-phase AC power from the driving force of the engine 2 and outputs to the control device 10. The single-phase AC power inputted from the sub-power generator 23 to the control device 10 is converted into DC power via a control power supply 7 to be supplied to the respective units in the control device 10.

The control device 10 includes an SCR/DI bridge 31, a smoothing capacitor 33, an FET bridge 35, a choke coil 37, and a noise filter 39 connected in this sequence on a path that feeds the power from the main power generator 21 to an AC output unit 8. Note that the SCR/DI bridge 31 is an example of a converter, and that the FET bridge 35 is an example of an inverter.

The SCR/DI bridge 31 converts the three-phase AC power outputted from the main power generator 21 into DC power. The SCR/DI bridge 31 is a three-phase bridge converter including three thyristors (SCR) and three diodes (DI), for example, and converts three-phase AC power into DC power through full-wave rectification with the continuity of the thyristors being controlled.

The smoothing capacitor 33 smooths the DC power outputted from the SCR/DI bridge 31.

The FET bridge 35 converts the DC power outputted from the SCR/DI bridge 31 and smoothed by the smoothing capacitor 33, into AC power. The FET bridge 35 is a single-phase bridge inverter including four field effect transistors (FET), for example, and converts DC power into AC power having a predetermined frequency (for example, about 50 Hz or about 60 Hz) through control of the continuity of the FETs.

The AC power outputted from the FET bridge 35 passes through the choke coil 37 to remove harmonic waves and a noise filter 39 to remove noises to be outputted from the AC output unit 8 to the outside.

Figure 2:
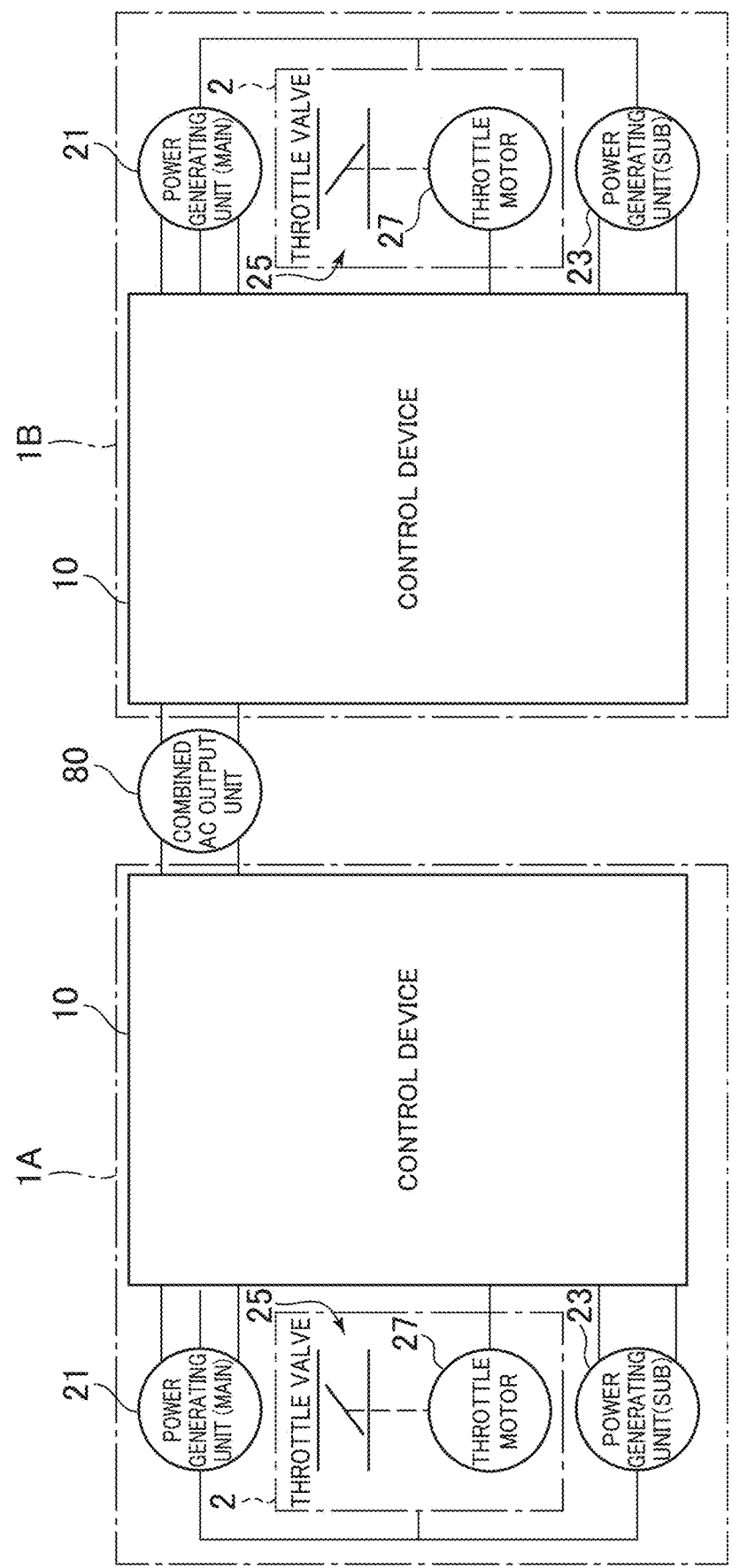
FIG. 2 is a block diagram illustrating an example of inverter power generators in parallel connection.

As illustrated in FIG. 2, a plurality of inverter power generators 1A, 1B according to a preferred embodiment may be connected in parallel for use. The AC powers outputted from the respective inverter power generators 1A, 1B are combined by a combined AC output unit 80 and outputted to the outside.

Returning to FIG. 1, the control device 10 includes a Central Processing Unit (CPU) 3. According to a program stored in a memory, not illustrated, the CPU 3 controls the throttle motor 27 via a motor driver 41, the SCR/DI bridge 31 via an SCR driver 43, and the FET bridge 35 via an FET driver 45. The CPU 3 applies pulse width modulation (PWM) control to the FET bridge 35.

An NE detector 51 supplies a detected signal to the CPU 3 which indicates the rotation speed of the engine. The NE detector 51 generates a pulse signal from an output from the power generator 21. Counting the pulse signals, the CPU 3 calculates the engine rotation speed.

A current detector 61 supplies a detected signal to the CPU 3, the detected signal indicating the output current of the AC power outputted from the FET bridge 35 and measured by a current sensor 55. The current sensor 55 is disposed, for example, between the choke coil 37 and the noise filter 39. An overcurrent detector 63 supplies a detected signal indicating generation of an overcurrent to the CPU 3 when the output current outputted from the FET bridge 35 exceeds a threshold.

A voltage detector 65 supplies a detected signal to the CPU 3 which indicates the output voltage of the AC power outputted from the FET bridge 35. The voltage detector 65 is connected, for example, between the choke coil 37 and the noise filter 39.

The CPU 3 executes a program stored in a memory, not illustrated, to function as a target rotation speed determiner that determines a target engine rotation speed, and an actuator controller that controls the throttle motor 27 based on the determined target engine rotation speed. The operation of the CPU 3 will be described below in detail.

Figure 3:
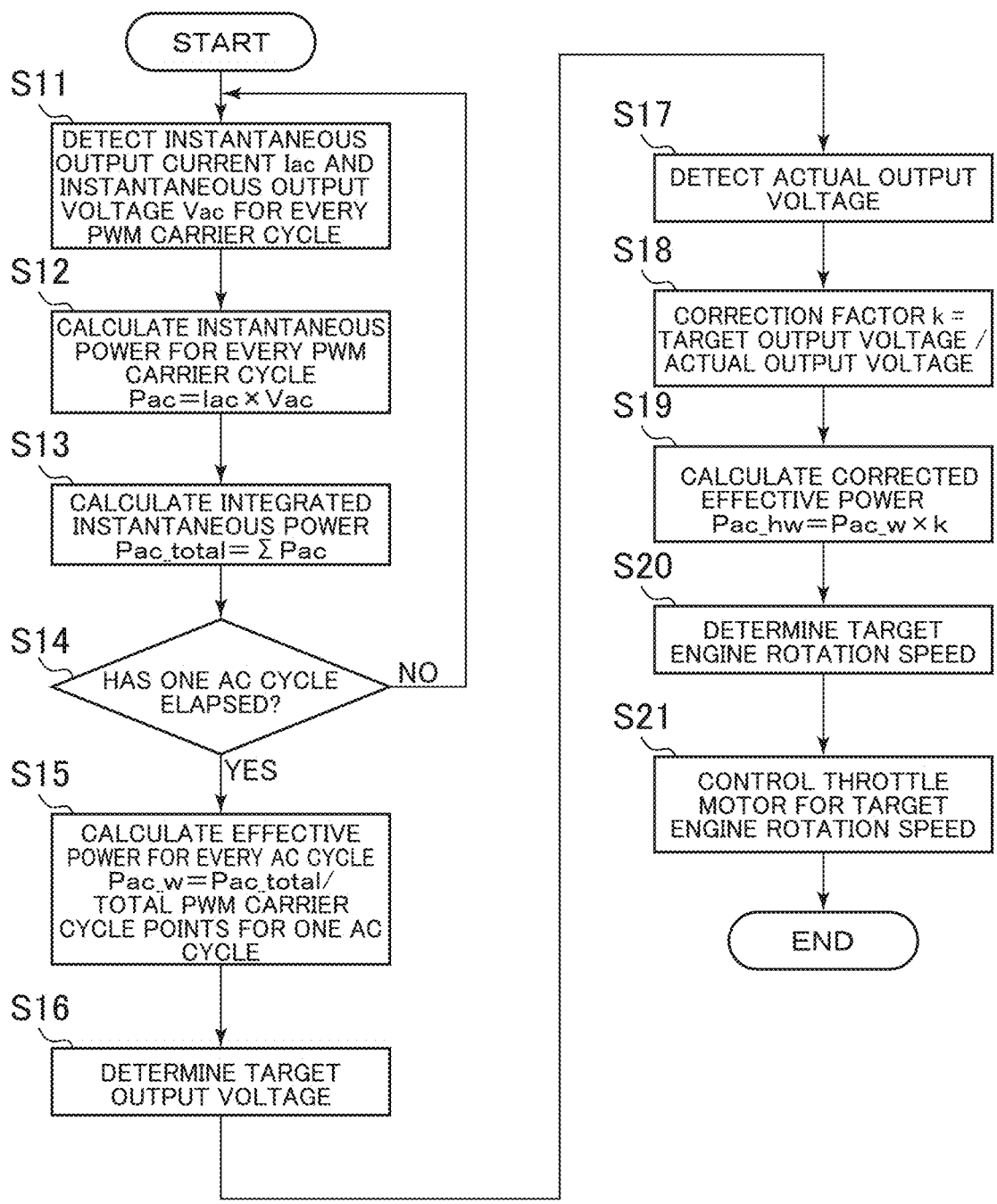
FIG. 3 is a flowchart of an example of a method that controls an inverter power generator according to a preferred embodiment of the present invention.

FIG. 3 is a flowchart of an example of a method that controls an inverter power generator according to a preferred embodiment of the present invention. Following a program stored in the memory, not illustrated, the CPU 3 repetitively executes the engine rotation speed control illustrated in FIG. 3 in a predetermined cycle.

In steps S11 to S15, the CPU 3 calculates the effective power of the AC power outputted from the FET bridge 35 based on a detected current value from the current detector 61 and a detected voltage value from the voltage detector 65. Specifically, the CPU 3 detects an instantaneous output current Iac and an instantaneous output voltage Vac for every cycle of a PWM carrier (S11), then calculates an instantaneous power Pac (=Iac×Vac), based on the detected instantaneous output current Iac and instantaneous output voltage Vac (S12), and further calculates an integrated instantaneous power Pac_total (=ΣPac) through integration of the calculated instantaneous powers Pac (S13). Then, after the elapse of one AC cycle (S14: YES), the CPU 3 calculates an effective power Pac_w (=Pac_total/total of PWM carrier cycle points for one AC cycle) for every AC cycle (S15). This, however, is not exclusive, and the effective power may be calculated by multiplying the AC power outputted from the FET bridge 35 by a power factor cosφ that is based on the phase difference φ between the output voltage and output current outputted from the FET bridge 35.

In steps S16 to S18, the CPU 3 calculates a correction factor. Specifically, the CPU 3 determines a target output voltage for the AC power to be outputted from the FET bridge 35 (S16), detects the actual output voltage of the AC power outputted from the FET bridge 35 via the voltage detector 65 (S17), and divides the target output voltage by the actual output voltage to calculate a correction factor k (S18). Note that the actual output voltage is an effective value for one AC cycle. Specifically, the actual output voltage is a voltage value obtained by integrating the detected instantaneous output voltages Vac for one AC cycle and averaging the integrated value. The correction factor k is a value based on the difference between the target output voltage and the actual output voltage, and, for example, increases when the difference between the target output voltage and the actual output voltage increases. Note that the correction factor k is not limited to a quotient obtained by dividing the target output voltage by the actual output voltage, but may be the difference obtained by subtracting the actual output voltage from the target output voltage. In a preferred embodiment of the present invention, in the case that the inverter power generators are connected in parallel, the target output value is not a fixed value, though close to a rating voltage (for example, 100V), but varies in accordance with the effective power, as to be described below.

At step S19, the CPU 3 calculates a corrected effective power based on the effective power calculated at step S15 described above and the correction factor calculated at step S18 described above. Specifically, the CPU 3 multiplies the effective power Pac_w by the correction factor k to calculate a corrected effective power Pac_hw. For example, the corrected effective power Pac_w increases when the difference between the target output voltage and the actual output voltage increases. Note that the corrected effective power Pac_hw, which is a value obtained by multiplying the effective power Pac_w by the correction factor k, may be rephrased as a value obtained by dividing the effective power Pac_w by the ratio of the actual output voltage to the target output voltage (that is, the reciprocal of the correction factor k) (refer to Expression 1 below).

$$\text{Corrected effective power } P_{ac\_hw} = \frac{\text{effective power } P_{ac\_w}}{\left(\frac{\text{actual output voltage}}{\text{target output voltage}}\right)} \quad \text{Expression 1}$$

$$\frac{\text{actual output voltage}}{\text{target output voltage}} = \frac{1}{\text{correction factor } k}$$

Figure 4:
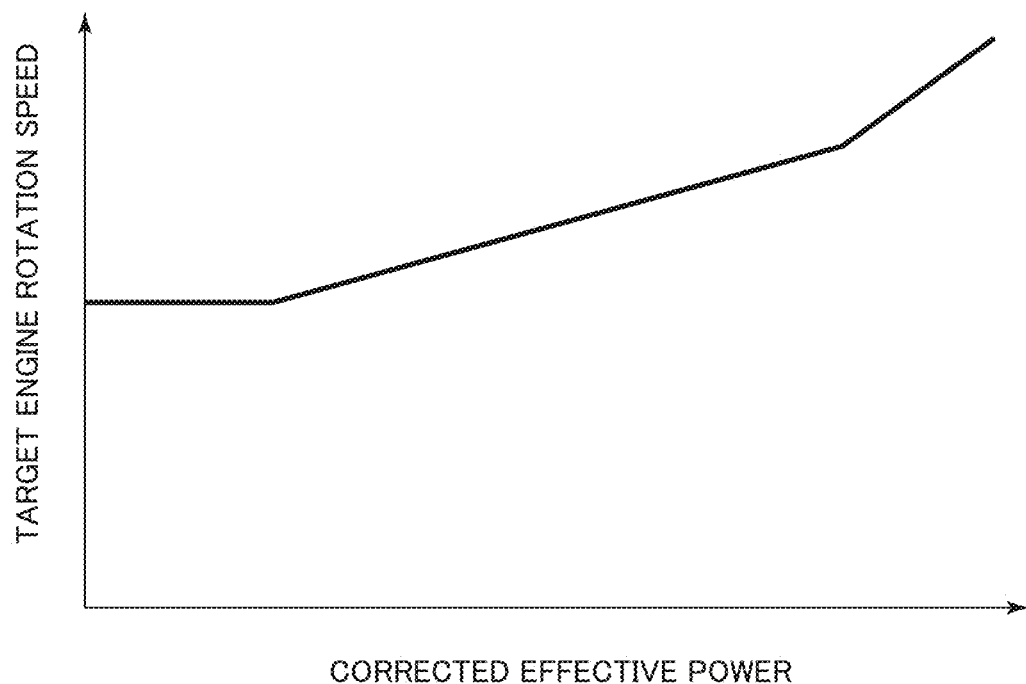
FIG. 4 illustrates an example of a relationship between a corrected effective power and a target engine rotation speed.

At step S20, the CPU 3 determines the target engine rotation speed based on the corrected effective power calculated at step S19 described above. Specifically, the CPU 3 reads a target engine rotation speed corresponding to the corrected effective power Pac_hw from a look-up table stored in a memory, not illustrated. FIG. 4 illustrates an example of a relationship between the corrected effective power and the target engine rotation speed. For example, basically, the target engine rotation speed is set such that a higher corrected effective power leads to a higher target engine rotation speed. That is, the target engine rotation speed, which is based on the corrected effective power, is higher, for example, when the difference between the target output voltage and the actual output voltage is larger.

At step S21, the CPU 3 controls the throttle motor 27 based on the target engine rotation speed determined at step S20 described above. Specifically, the CPU 3 applies feedback control to the throttle motor 27 such that the difference between the determined target engine rotation speed and the detected actual engine rotation speed is reduced.

In the above-described preferred embodiment, as the target engine rotation speed is determined based on the corrected effective power, it is possible to improve the responsiveness in controlling the engine rotation speed. That is, the corrected effective power is corrected so as to increase when the difference between the target output voltage and the actual output voltage increases. Accordingly, the target engine rotation speed is determined so as to increase when the difference between the target output voltage and the actual output voltage increases. This makes it possible to promptly increase the engine rotation speed.

Figure 5:
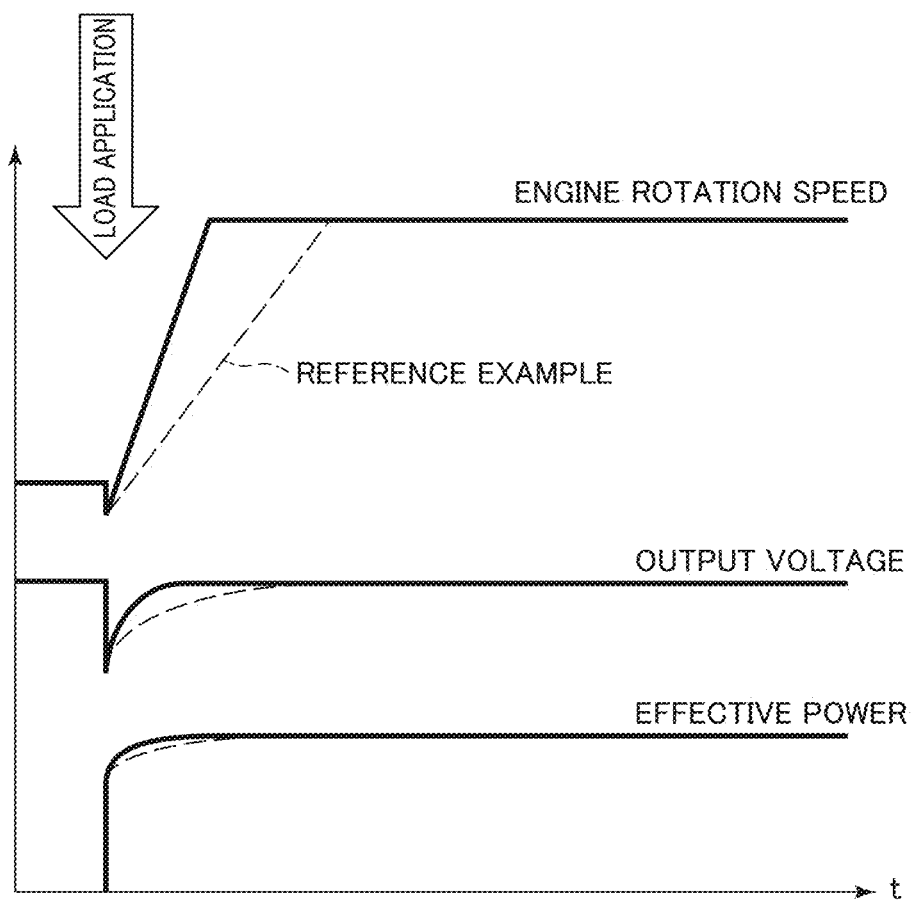
FIG. 5 illustrates an example of change as time passes in an output voltage, an effective power, and an engine rotation speed.

An effect of the present preferred embodiment will be described referring to FIG. 5. FIG. 5 illustrates an example of change as time passes in the output voltage, the effective power, and the engine rotation speed. The solid lines in the drawing indicate an example of a preferred embodiment of change as time passes when the target engine rotation speed is determined based on the corrected effective power. Meanwhile, the broken lines in the drawing indicate a reference example of change as time passes when the target engine rotation speed is determined based on the effective power that is not corrected.

Before application of a load to the AC output unit 8, the engine 2 remains in an idle state, and the output voltage of the inverter power generator 1 is kept at the target output voltage.

With a load applied to the AC output unit 8, the output voltage of the inverter power generator 1 instantaneously drops from the target output voltage. Hence, the effective power does not rise instantly to a sufficient level. In accordance with this effective power yet to rise to the sufficient level, a relatively low target engine rotation speed is set in the reference example. Thus, it takes time for the engine rotation speed to increase.

On the contrary, in the present preferred embodiment, the target engine rotation speed is determined based on the corrected effective power, which has been corrected so as to increase when the difference between the target output voltage and the actual output voltage increases. Consequently, a relatively high target engine rotation speed is set. This makes it possible for the engine rotation speed to increase promptly.

Note that although FIG. 5 illustrates a time of application of a load as an example, this is not exclusive, and the responsiveness in controlling the engine rotation speed is similarly improved at any other time when the load varies.

The preferred embodiments of the present invention are not limited to the target engine rotation speed being determined based on the effective power, and the target engine rotation speed may be determined based on an output current and/or also to an apparent power. That is, the output current or the apparent power may be corrected so as to increase when the difference between the target output voltage and the actual output voltage increases before determination of the target engine rotation speed based on the corrected output current or apparent power.

The preferred embodiments of the present invention produce a remarkable effect when an inductive load is connected when the target engine rotation speed is determined based on the effective power. That is, in the case that an inductive load is connected, the effective power (a power consumed in a load) is small, and accordingly a relatively low target engine rotation speed is set with the effective power being used. This likely results in lower responsiveness in controlling the engine rotation speed, compared when an output current or an apparent power is used. In view of the above, the effective power is corrected so as to increase when the difference between the target output voltage and the actual output voltage increases, and the target engine rotation speed is determined based on the corrected effective power. This makes it possible to improve the responsiveness in controlling the engine rotation speed even when the effective power is used.

Note that a method for correcting the effective power using a correction value is not particularly limited provided that a higher target engine rotation speed results when the difference between the target output voltage and the actual output voltage increases. Alternatively, the target engine rotation speed may be determined based on the effective power, and then corrected using a correction value.

Figure 6:
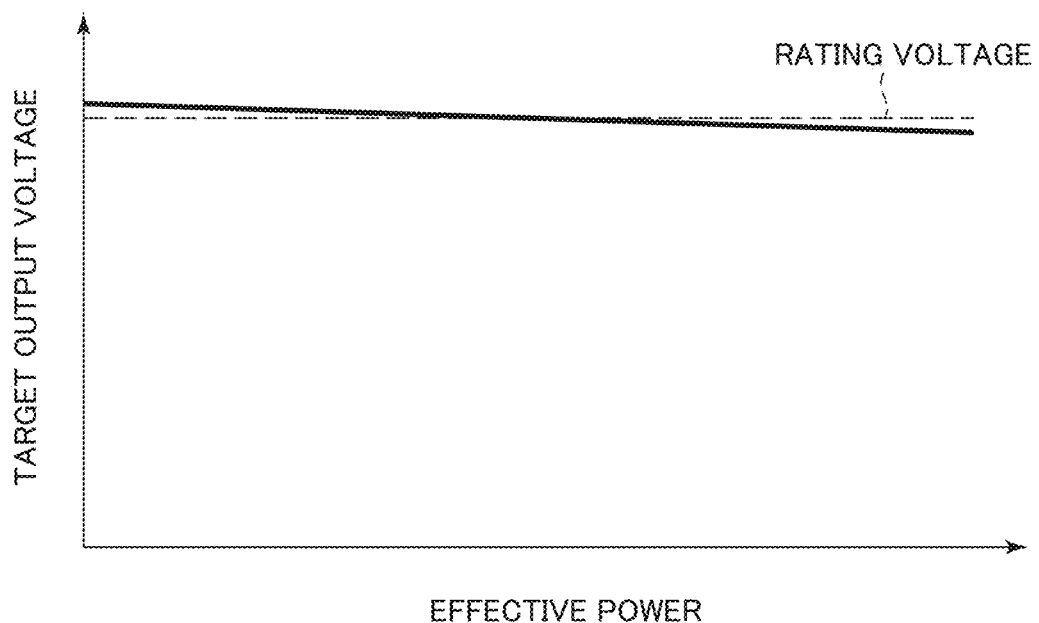
FIG. 6 illustrates an example of a relationship between an effective power and a target output voltage.

FIG. 6 illustrates an example of a relationship between the effective power and the target output voltage. As described above, the target output voltage takes a value close to the rating voltage (for example, about 100 V), and varies in accordance with the effective power. Specifically, the target output voltage linearly varies so as to become gradually lower as the effective power becomes higher.

Figure 7A:
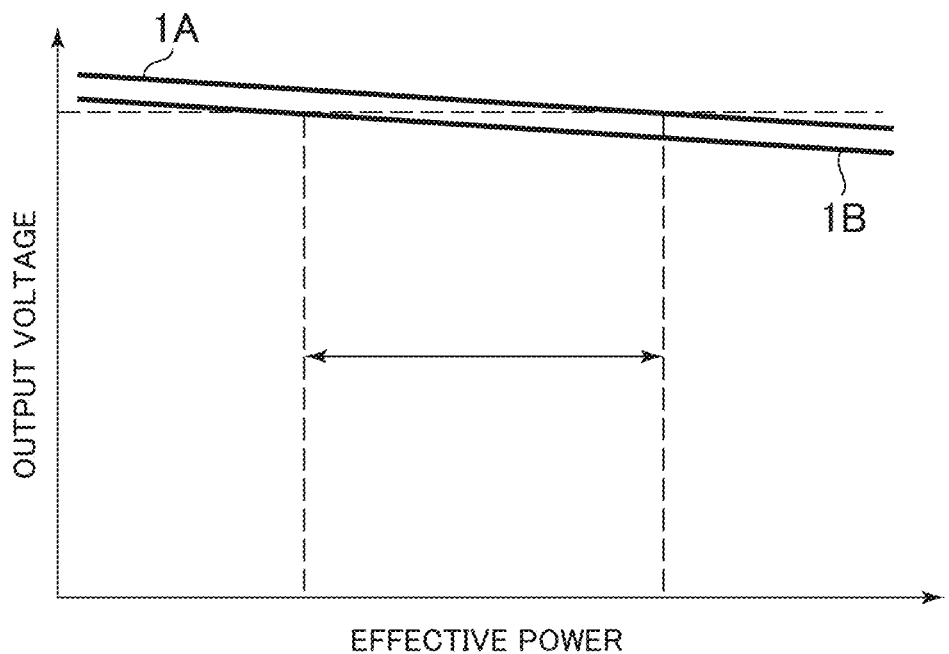
FIG. 7A illustrates a first example of a relationship between an effective power and an output voltage.
Figure 7B:
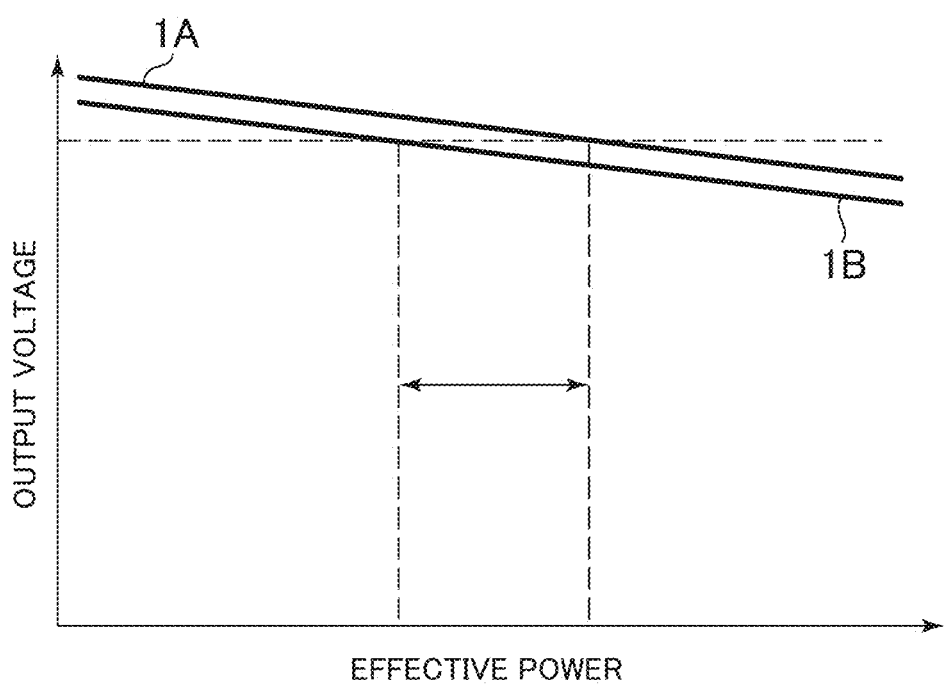
FIG. 7B illustrates a second example of a relationship between an effective power and an output voltage.

Such variation is intended to reduce a charging current that flows from one to the other of the inverter power generators 1A, 1B connected in parallel as illustrated in FIG. 2. That is, as illustrated in FIGS. 7A and 7B, the characteristics of the inverter power generators 1A, 1B may differ from each other. Thus, the effective powers of the respective inverter power generators 1A, 1B connected in parallel to output the same output voltage may differ from each other. In this case, a charging current based on the difference in the effective power flows from one to the other of the inverter power generators 1A, 1B. As a charging current is proportional to the difference in the effective power, the charging current is higher when the inclination of a straight line indicating the relationship between the effective power and the output voltage is smaller, and lower when the inclination is larger. Hence, in the present preferred embodiment, the straight line indicating the relationship between the effective power and the target output voltage is provided with an inclination as is illustrated in FIG. 6.

In the present preferred embodiment, the effective power is calculated based on the detected output voltage and the detected output current, and the correction factor is calculated using the target output voltage which varies in accordance with the effective power. This makes it possible to set an appropriate target engine rotation speed.

On the contrary, calculation of a power or a correction factor based on an assumption that an output voltage is a fixed value when the output voltage actually varies may possibly hinder setting an appropriate target engine rotation speed. For example, in the case that the voltage value used in the calculation is lower than the actual output voltage, the target engine rotation speed may be set below an appropriate level, and a sufficient power may not possibly be obtained. Further, the correction factor may not be large enough, and it thus may possibly take time for the engine rotation speed to increase. Meanwhile, in the case that the voltage value used in the calculation is higher than the actual output voltage, the target engine rotation speed may be set in excess of an appropriate level, which may possibly adversely affect the fuel consumption and noise.

Although preferred embodiments of the present invention have been described above, the present invention is not limited to the above-described preferred embodiments. Various modified preferred embodiments are achievable for a person skilled in the art.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An inverter power generator comprising:
an engine;
an actuator that adjusts a position of a throttle valve of the engine;
a power generator that generates AC power from a driving force of the engine;
a converter that converts the AC power outputted from the power generator into DC power;
an inverter that converts the DC power outputted from the converter into AC power;
a current detector that detects a current of the AC power outputted from the inverter;
a voltage detector that detects a voltage of the AC power outputted from the inverter;
a target rotation speed determiner that determines a target rotation speed of the engine based on a detected current value detected by the current detector and a correction value based on a difference between a target voltage value of the AC power outputted from the inverter and a detected voltage value detected by the voltage detector; and
an actuator controller that controls the actuator based on the target rotation speed determined by the target rotation speed determiner; wherein
the target rotation speed determiner determines the target rotation speed based on a power value and the correction value, and the power value is calculated based on the detected current value and the detected voltage value;
the target rotation speed determiner determines the target rotation speed based on a corrected power value calculated based on the power value and the correction value; and
the corrected power value is obtained by dividing the power value by a ratio of the detected voltage value to the target voltage value.

2. The inverter power generator according to claim 1, wherein the power value is an effective power value.

3. The inverter power generator according to claim 2, wherein the target voltage value varies in accordance with the power value.

4. The inverter power generator according to claim 1, wherein the target rotation speed increases when a difference between the target voltage value and the detected voltage value increases.

5. The inverter power generator according to claim 1, wherein the corrected power value increases when a difference between the target voltage value and the detected voltage value increases.

6. The inverter power generator according to claim 1, wherein the target rotation speed determiner reads the target rotation speed corresponding to the corrected power value from a look-up table.

7. A method of controlling an inverter power generator including an engine, an actuator that adjusts a position of a throttle valve of the engine, a power generator that generates AC power from a driving force of the engine, a converter that converts the AC power outputted from the power generator into DC power, an inverter that converts the DC power outputted from the converter into AC power, a current detector that detects a current of the AC power outputted from the inverter, and a voltage detector that detects a voltage of the AC power outputted from the inverter, the method comprising:
determining a target rotation speed of the engine based on a detected current value detected by the current detector and a correction value based on a difference between a target voltage value of the AC power outputted from the inverter and a detected voltage value detected by the voltage detector; and
controlling the actuator based on the determined target rotation speed; wherein
the target rotation speed is determined based on a power value and the correction value, and the power value is calculated based on the detected current value and the detected voltage value;
the target rotation speed is determined based on a corrected power value calculated based on the power value and the correction value; and
the corrected power value is obtained by dividing the power value by a ratio of the detected voltage value to the target voltage value.

8. An inverter power generator comprising:
an engine;

an actuator that adjusts a position of a throttle valve of the engine;

a power generator that generates AC power from a driving force of the engine;

a converter that converts the AC power outputted from the power generator into DC power;

an inverter that converts the DC power outputted from the converter into AC power;

a current detector that detects a current of the AC power outputted from the inverter;

a voltage detector that detects a voltage of the AC power outputted from the inverter;

a target rotation speed determiner that determines a target rotation speed of the engine based on a detected current value detected by the current detector and a correction value based on a difference between a target voltage value of the AC power outputted from the inverter and a detected voltage value detected by the voltage detector; and an actuator controller that controls the actuator based on the target rotation speed determined by the target rotation speed determiner; wherein the target rotation speed determiner determines the target rotation speed based on a power value and the correction value, and the power value is calculated based on the detected current value and the detected voltage value;

the power value is an effective power value; and the target voltage value varies so as to become lower as the power value becomes higher.

9. A method of controlling an inverter power generator including an engine, an actuator that adjusts a position of a throttle valve of the engine, a power generator that generates AC power from a driving force of the engine, a converter that converts the AC power outputted from the power generator into DC power, an inverter that converts the DC power outputted from the converter into AC power, a current detector that detects a current of the AC power outputted from the inverter, and a voltage detector that detects a voltage of the AC power outputted from the inverter, the method comprising:

determining a target rotation speed of the engine based on a detected current value detected by the current detector and a correction value based on a difference between a target voltage value of the AC power outputted from the inverter and a detected voltage value detected by the voltage detector; and controlling the actuator based on the determined target rotation speed; wherein the target rotation speed is determined based on a power value and the correction value, and the power value is calculated based on the detected current value and the detected voltage value;

the power value is an effective power value; and the target voltage value varies so as to become lower as the power value becomes higher.

* * * * *